(12) United States Patent
Park et al.

(10) Patent No.: US 10,976,729 B2
(45) Date of Patent: Apr. 13, 2021

(54) METHOD OF GENERATING PLANT NORMAL STATE PREDICTION DATA AND APPARATUS USING THE SAME

(71) Applicant: DOOSAN HEAVY INDUSTRIES & CONSTRUCTION CO., LTD., Changwon-si (KR)

(72) Inventors: Jee Hun Park, Gwangmyeong-si (KR); Hyun Sik Kim, Gimpo-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 95 days.

(21) Appl. No.: 16/018,075

(22) Filed: Jun. 26, 2018

(65) Prior Publication Data

US 2019/0072942 A1 Mar. 7, 2019

(30) Foreign Application Priority Data

Sep. 1, 2017 (KR) .................. 10-2017-0112166

(51) Int. Cl.
*G05B 19/048* (2006.01)
*G05B 13/04* (2006.01)
(Continued)

(52) U.S. Cl.
CPC ..... *G05B 19/41885* (2013.01); *G05B 13/042* (2013.01); *G05B 13/048* (2013.01);
(Continued)

(58) Field of Classification Search
CPC .......................... G05B 19/41885; G05B 17/02; G05B 13/042; G05B 13/048; G05B 23/0221; G05B 23/0254

See application file for complete search history.

(56) References Cited

U.S. PATENT DOCUMENTS 7,739,096 B2 * 6/2010 Wegerich ............... G05B 17/02
702/183
9,466,032 B2 * 10/2016 Dull ..................... G06N 3/0481
(Continued)

FOREIGN PATENT DOCUMENTS

| EP | 3454289 A1 | 3/2019 |
| KR | 10-2010-0042293 A | 4/2010 |
| WO | 2016/089794 A1 | 6/2016 |

OTHER PUBLICATIONS

Y. Chen et al., "Similarity-based Classification: Concepts and Algorithms," Journal of Machine Learning Research 10 (2009) pp. 747-776. (Year: 2009).*

(Continued)

*Primary Examiner* — M. N. Von Buhr
(74) *Attorney, Agent, or Firm* — Invenstone Patent, LLC (57) ABSTRACT

A data prediction method and apparatus generate plant normal state prediction data based on measurement data of multiple tags and a plant prediction model, to enhance accuracy of anomaly/fault prediction by providing precise prediction data in the normal state even in a plant anomaly/fault condition. The method includes generating primary prediction data by performing primary prediction based on the measurement data and the plant prediction model; selecting an anomalous state tag among the multiple tags, the selected anomalous state tag determined as data of an anomalous state based on measurement data corresponding to the primary prediction data; updating the plant prediction model by using the measurement data of only normal state tags; and generating secondary prediction data by performing secondary prediction based on the measurement data of the normal state tags and the updated plant prediction model. Secondary prediction is performed only when an anomalous state tag is selected.

12 Claims, 8 Drawing Sheets

(51) Int. Cl.
G05B 23/02 (2006.01)
G05B 19/418 (2006.01)
G05B 17/02 (2006.01)

(52) U.S. Cl.
CPC ..... G05B 23/0221 (2013.01); G05B 23/0254 (2013.01); G05B 17/02 (2013.01)

(56) References Cited

U.S. PATENT DOCUMENTS

| | | | | |
|---|---|---|---|---|
| 2003/0083756 | A1* | 5/2003 | Hsiung | G05B 15/02 700/28 |
| 2005/0131572 | A1* | 6/2005 | Broese | G05B 13/042 700/148 |
| 2005/0267606 | A1* | 12/2005 | Bartlett, Jr. | G05B 13/042 700/29 |
| 2006/0047485 | A1* | 3/2006 | Whitefield | G06T 7/0004 702/194 |
| 2008/0071501 | A1* | 3/2008 | Herzog | G05B 23/0254 702/185 |
| 2009/0055145 | A1* | 2/2009 | Volponi | G05B 17/02 703/7 |
| 2009/0125285 | A1* | 5/2009 | Gugaliya | G05B 17/02 703/2 |
| 2010/0057237 | A1* | 3/2010 | Kettaneh | G05B 19/41885 700/103 |
| 2010/0066531 | A1* | 3/2010 | Karr | G06Q 10/00 340/539.1 |
| 2011/0153295 | A1* | 6/2011 | Yerramalla | G05B 17/02 703/7 |
| 2012/0041575 | A1* | 2/2012 | Maeda | G05B 23/024 700/80 |
| 2012/0078823 | A1* | 3/2012 | Suyama | G05B 23/0254 706/12 |
| 2012/0330631 | A1* | 12/2012 | Emigholz | G05B 13/048 703/2 |
| 2013/0253898 | A1* | 9/2013 | Meagher | G06F 30/20 703/18 |
| 2014/0278397 | A1* | 9/2014 | Chen | G10L 21/02 704/233 |
| 2017/0161963 | A1* | 6/2017 | Green | G07C 5/004 |
| 2017/0185902 | A1* | 6/2017 | Kumar | G06N 20/00 |
| 2018/0239315 | A1* | 8/2018 | McKinley | F01K 13/02 |
| 2019/0198136 | A1* | 6/2019 | Hou | G05B 13/0265 |
| 2019/0210176 | A1* | 7/2019 | Yamamoto | B23Q 17/09 |

OTHER PUBLICATIONS

M.Z. Jahromi et al., "A method of learning weighted similarity function to improve the performance of nearest neighbor," Information Sciences 179 (2009), pp. 2964-2973. (Year: 2009).*
A Korean Office Action dated Jan. 31, 2019 in connection with Korean Patent Application No. 10-2017-0112166 which corresponds to the above-referenced U.S. application.
2004 Proceedings of the Autumn Conference, Korean Statistical Society.
A German Office Action dated Apr. 10, 2019 in connection with German Patent Application No. 102018116696.6 which corresponds to the above-referenced U.S. application.

* cited by examiner

METHOD OF GENERATING PLANT NORMAL STATE PREDICTION DATA AND APPARATUS USING THE SAME

CROSS REFERENCE TO RELATED APPLICATIONS

The present application claims priority to Korean Patent Application No. 10-2017-0112166, filed Sep. 1, 2017, the entire contents of which is incorporated herein for all purposes by this reference.

BACKGROUND OF THE INVENTION

Field of the Invention

The present invention relates generally to an apparatus and method of predicting plant data in a system for generating prediction data on a plant based on a plant prediction model and for detecting anomalies of the plant by comparing the prediction data with measurement data, the apparatus and method being capable of providing precise prediction data in a normal state even though the measurement data contains data in an anomalous state.

Description of the Related Art

Generally, large-scale plants, such as power or chemical plants, etc., are operated in a complex connection with various types of hundreds of machines and electrical facilities. In order to secure reliability of such plants and normal operation thereof, it is necessary to continuously monitor anomalous signs which may result in accidents. Thus, a monitoring device that detects in real-time whether main components constituting the plant are damaged and that generates an alarm for an operator when anomalous signs are found on the components has been used.

That is, plant faults and other anomalies can damage the plant and cause undesired performance. Furthermore, if the plant is destroyed, people can be injured or killed, and environmental problems can be caused. Therefore, an early warning system is needed for early detection of faults.

Generally, the early warning system for warning of faults or the possibility of faults is based on a plant model, which is that the plant is modeled. The system receives and stores observation signals measured in real time by using a sensor, etc. in the plant, and based on this, distinguishes anomalous signals to inform thereof in advance. Therefore, in the system for detecting faults, the most important part may be a plant model.

However, the plant model provides prediction data by modeling a normal state, but accurate prediction data may not be provided in an anomaly/fault condition. That is, the plant model generally sets the plant model and provides optimum prediction data depending on input measurement data. However, when the input measurement data has partially incorrect values due to anomalies or faults, output prediction data also has incorrect values rather than values of a normal state. Even so, accurate prediction data in a normal state is desired even though the plant may be in fault state or experiencing an anomaly of some kind. Therefore, it is necessary to develop a plant model capable of providing accurate prediction data in a normal state even though anomalous state data is input.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention is intended to propose an apparatus and method of predicting plant data, the apparatus and method being capable of providing precise prediction data in a normal state even though data partially in an anomalous state is input.

Also, the present invention is intended to propose an apparatus and method of predicting plant data, the apparatus and method being capable of providing more precise prediction data in a normal state by determining that a state of a plant is anomalous, even if an anomalous state guideline that is overly generous (insufficiently restrictive) is applied so that the state is not determined by the system to be anomalous.

In order to achieve the above object, according to one aspect of the present invention, there is provided a method of generating plant normal state prediction data based on measurement data of multiple tags and a plant prediction model. The method may include generating primary prediction data by performing primary prediction based on the measurement data and the plant prediction model; selecting an anomalous state tag among the multiple tags, the selected anomalous state tag determined as data of an anomalous state based on measurement data corresponding to the primary prediction data; updating the plant prediction model by using the measurement data of only normal state tags; and generating secondary prediction data by performing secondary prediction based on the measurement data of the normal state tags and the updated plant prediction model.

The anomalous state tag may be selected by calculating a difference between the measurement data and the primary prediction data obtained as a result of the primary prediction for each of the multiple tags, and identifying a tag showing the difference to be greater than or equal to a preset value or a preset ratio or identifying a tag showing the difference to be at least n times greater than the average of differences between the primary prediction data and the measurement data of all tags.

The plant prediction model may contain multiple data sets each having a single value for each of the multiple tags, and wherein the primary prediction data is generated by determining similarity between each of the multiple data sets and the measurement data of the multiple tags; selecting k data sets in order of decreasing similarity among the multiple data sets; and determining the primary prediction data for each tag by one of obtaining an average for each tag based on the k data sets, and obtaining an average for each tag by multiplying each of the k data sets by a weight.

The weight multiplied by each of the k data sets may be a higher weight for determinations of a higher similarity in each data set.

The updated plant prediction model may be represented by an n×m matrix to an n*×m matrix in which a row corresponding to the selected anomalous state tag is removed, where n is a number of the tags, m is a number of the data sets, and n* is obtained by subtracting a number of anomalous state tags from n.

The plant prediction model may contain multiple data sets each having a single value for each of the multiple tags, and the secondary prediction data may be generated by determining similarity between each of multiple data sets contained in the internal plant prediction model and the measurement data of the normal state tags; selecting k data sets in order of decreasing similarity among the multiple data sets; and determining the secondary prediction data for each tag by one of obtaining an average for each tag based on the k data sets, and obtaining an average for each tag by multiplying each of the k data sets by a weight.

The method may further include determining the anomalous state based on the prediction data and the measurement data of the multiple tags.

According to another aspect of the present invention, there is provided a method of determining an anomalous state of a plant. The method may include obtaining measurement data of multiple tags of the plant; generating a prediction model by performing plant modeling based on the measurement data; and generating prediction data based on the prediction model and the measurement data of the multiple tags, by generating primary prediction data by performing primary prediction based on the measurement data and the plant prediction model; selecting an anomalous state tag among the multiple tags, the selected anomalous state tag determined as data of an anomalous state based on measurement data corresponding to the primary prediction data; updating the plant prediction model by using the measurement data of only normal state tags; and generating secondary prediction data by performing secondary prediction based on the measurement data of the normal state tags and the updated plant prediction model. The method may further include determining the anomalous state based on the generated prediction data and the measurement data of the multiple tags.

According to another aspect of the present invention, there is provided an apparatus for generating plant normal state prediction data based on measurement data of multiple tags and a plant prediction model, through primary prediction and secondary prediction. The apparatus may include a data processing unit configured to output the measurement data of the multiple tags in the primary prediction and to output the measurement data of normal state tags, from which the measurement data of an anomalous state tag has been removed, in the secondary prediction; a prediction unit configured to receive the outputs from the data processing unit, to generate primary prediction data based on the plant prediction model and the measurement data of the multiple tags in the primary prediction, and to generate secondary prediction data based on an internal plant prediction model and the measurement data of the normal state tags in the secondary prediction; an early detecting unit configured to select the anomalous state tag based on the primary prediction data and the measurement data of multiple tags, to output the primary prediction data as the prediction data when the selected anomalous state tag is not selected, and to output the secondary prediction data as the prediction data when the selected anomalous state tag is selected; and an internal modeling unit configured to generate the internal plant prediction model, to update the internal plant prediction model based on information on the anomalous state tag received from the early detecting unit in the secondary prediction, and to transmit the updated plant prediction model to the prediction unit.

The secondary prediction may be performed only when the early detecting unit has selected the anomalous state tag.

The early detecting unit may calculate a difference between the primary prediction data and the measurement data for each of the multiple tags, and select a tag showing the difference to be greater than or equal to a preset value or a preset ratio as the anomalous state tag or select a tag showing the difference to be at least n times greater than the average of differences between the primary prediction data and the measurement data of all tags.

The prediction unit may be further configured to determine similarity between each of the multiple data sets contained in the internal plant prediction model and the measurement data of the multiple tags, wherein a single data set has a single value for each of the multiple tags; select k data sets in order of decreasing similarity among the multiple data sets of the internal plant prediction model; and determine the primary prediction data for each tag by one of obtaining an average for each tag based on the k data sets, and obtaining an average for each tag by multiplying each of the k data sets by a weight. The prediction unit may be further configured to multiply a higher weight, as the weight multiplied by each of the k data sets, for determinations of a higher similarity in each data set.

The prediction unit may be configured to determine similarity between each of multiple data sets contained in the internal plant prediction model and the measurement data of the normal state tags, wherein a single data set has a single value for each of the normal state tags; select k data sets in order of decreasing similarity among the multiple data sets of the internal plant prediction model; and determine the secondary prediction data for each tag by one of obtaining an average for each tag based on the k data sets, and obtaining an average for each tag by multiplying each of the k data sets by a weight.

The internal modeling unit may be further configured to update the internal plant prediction model using an n×m matrix to an n*×m matrix in which a row corresponding to the selected anomalous state tag is removed, where n is a number of the tags, m is a number of the data sets, and n* is obtained by subtracting a number of anomalous state tags from n.

According to another aspect of the present invention, there is provided an anomalous state determining apparatus for determining an anomalous state of a plant. The apparatus may include a plant modeling unit generating a plant prediction model by modeling the plant based on measurement data of multiple tags, which is obtained by measuring the plant; the above apparatus for generating plant normal state prediction data; and an anomaly detecting unit determining the anomalous state based on the prediction data and the measurement data of the multiple tags.

According to another aspect of the present invention, there is provided a computer-readable recording medium having a computer program recorded thereon, the program enabling the above method of generating plant normal state prediction data to be performed by a computer or a processor.

According to the present invention, even in an anomaly/fault condition of the plant, accuracy of anomaly/fault prediction may be enhanced by providing precise prediction data in the normal state.

Also, even in an anomaly/fault condition of the plant, a determination on anomalies/faults may be clarified by providing accurate prediction data in the normal state to an operator.

BRIEF DESCRIPTION OF THE DRAWINGS

The above and other objects, features and other advantages of the present invention will be more clearly understood from the following detailed description when taken in conjunction with the accompanying drawings, in which:

FIGS. 2A and 2B are graphical diagrams for illustrating examples of a process of generating prediction data by the prediction unit (300) of FIG. 1 in the case of two tags, wherein FIG. 2A shows a normal state case and FIG. 2B shows an anomalous state case.

DETAILED DESCRIPTION OF THE INVENTION

In order to clearly describe the present invention, parts not related to the description are omitted, and the same or similar elements are denoted by the same reference numerals throughout the specification.

Throughout the specification, when a part is referred to as being "connected" to another part, it includes not only being "directly connected", but also being "electrically connected" by interposing other parts therebetween. Also, when a part "includes" an element, it is noted that it further includes other elements, but does not exclude other elements, unless specifically stated otherwise.

When any part is referred to as being positioned "on" another part, it means the part is directly on the other part or above the other part with an intermediate part. In contrast, when any part is referred to as being positioned "directly on" another part, it means that there is no intermediate part between the two parts.

It is noted that although the terms "first", "second", "third", etc. may be used herein to describe various parts, components, regions, layers and/or sections, but are not limited thereto. These terms are only used to distinguish one part, component, region, layer or section from another part, component, region, layer or section. Thus, a first part, component, region, layer or section described below could be referred to as a second part, component, region, layer or section without departing from the scope of the present invention.

Technical terms used here are to only describe specific exemplary embodiments and are not intended to limit the present invention. Singular forms used here include plural forms unless phrases explicitly represent an opposite meaning. A meaning of "comprising" used in the specification embodies a specific characteristic, area, integer, step, operation, element and/or component and does not exclude presence or addition of another specific characteristic, area, integer, step, operation, element, and/or component.

Terms representing relative space, such as "below", "above", etc. may be used to more easily describe a relation between one portion and other portion shown in the drawings. Such terms are intended to include alternative meanings or operations of an apparatus in use as well as a meaning that is intended in the drawings. For example, when an apparatus is inverted in the drawings, a particular portion described as being "below" other portions is described as being "above" the portions. Therefore, an illustrative term "below" includes both up and down directions. An apparatus may be rotated by 90° or different angles, and a term representing relative space is accordingly interpreted.

Unless otherwise defined, all terms including technical and scientific terms used herein have the same meaning as commonly understood by one of ordinary skill in the art to which the present invention belongs. Commonly used predefined terms are further interpreted as having a meaning consistent with the relevant technical literature and the present disclosure, and are not to be construed as having ideal or very formal meanings unless defined otherwise.

Hereinafter, exemplary embodiments of the present invention will be described in detail with reference to the accompanying drawings such that the invention can be easily embodied by one of ordinary skill in the art to which this invention belongs. However, the present invention may be embodied in various different forms and should not be limited to the embodiments set forth herein.

Before describing the present invention, first, a tag is defined. The tag may mean a type of signal that may be measured in the plant. For example, the tag may mean a type of signal, such as a differential pressure of an inlet filter, a turbine exhaust pressure, a temperature, that may be directly obtained by using a sensor in the plant, and may also mean a calculated value, such as output power, based on the signal obtained by using the sensor in the plant.

Figure 1:
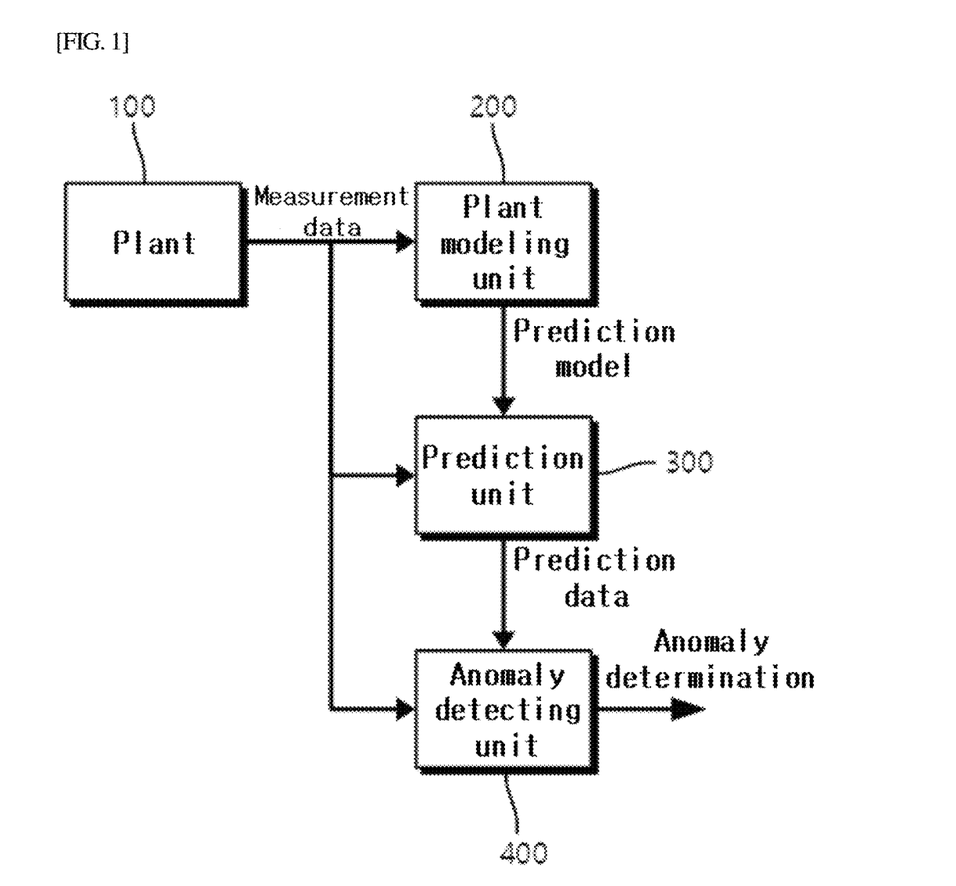
FIG. 1 is a block diagram of a plant anomaly detecting system.

FIG. 1 illustrates an embodiment of a plant anomaly detecting system.

Referring to FIG. 1, the plant anomaly detecting system may include a plant modeling unit 200, a prediction unit 300, and an anomaly detecting unit 400.

The plant modeling unit 200 obtains measurement data from measurement of a plant 100 by using a sensor or the like and generates a prediction model, which models a normal state of the plant, based on the measurement data. Every time the measurement data is input, the prediction model may be updated. Here, the plant modeling unit 200 may not use anomalous measurement data as input data for modeling on the basis of the anomaly determination result from the anomaly detecting unit 400 (described later) and may use only measurement data in a normal state without anomalies for plant modeling, thereby modeling the normal state of the plant.

The plant modeling unit 200 may generate a single prediction model or multiple prediction models. These models may be non-parametric models or parametric models.

The parametric models are models representing a system by using a finite number of parameters. That is, the parametric models may describe a system by using a few limited parameters. The parametric models include a first principles based model, a transfer function model, a state space model, etc. Here, the first principles based model may be a model using parameters that are determined by the first law of physics, which is fundamental and basic. The state space model may be a model using state variables as parameters. The transfer function model may be a model using variables, which define a transfer function between input and output, as parameters. Here, transfer function models include autoregressive with exogenous input (ARX), nonlinear autoregressive with exogenous input (NARX), finite impulse response (FIR), autoregressive moving average with exogenous input (ARMAX) models, etc.

The non-parametric models are models that may use an infinite number of parameters to represent the plant, and may include a non-parametric model (NPM), a tree model (TM), a neural network model (NNM), etc. Although non-parametric models may use an infinite number of parameters theoretically, in practice, only a finite number of parameters may be used for representation.

The prediction model generated by the plant modeling unit 200 may be represented by an n×m matrix. Here, the number of tags may be designated by n, and the number of data points for each tag may be designated by m.

The prediction unit 300 may generate prediction data based on the prediction model generated by the plant modeling unit 200 and the measurement data.

As an embodiment, the prediction unit 300 may check similarity by comparing each column of the prediction model represented by the n×m matrix with the measurement data, may select several columns in order of decreasing similarity, and may obtain a weighted average of values of the selected columns, thereby generating the prediction data having a prediction value for each tag. In the case of using multiple prediction models, respective prediction values may be obtained for the multiple prediction models, optimum prediction data may be obtained by using ensemble learning based on the multiple prediction values, thereby generating final prediction data.

The anomaly detecting unit 400 determines the plant is anomalous when a difference, which is obtained by the prediction unit 300, between the prediction data and the measurement data is greater than or equal to a preset residual value or residual ratio. Here, the anomaly detecting unit 400 may also generate information on a tag which is determined to be anomalous.

Hereinafter, the function of the prediction unit 300 will be described in detail.

Figure 2A:
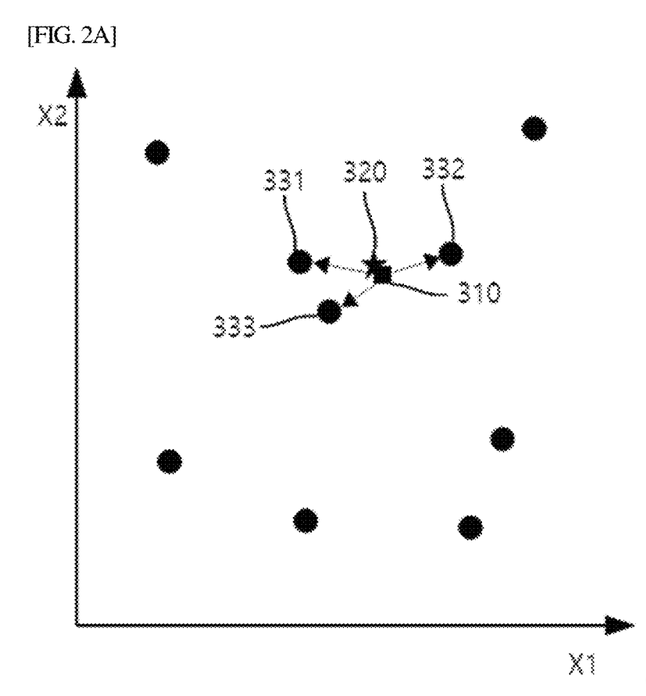
Figure 2B:
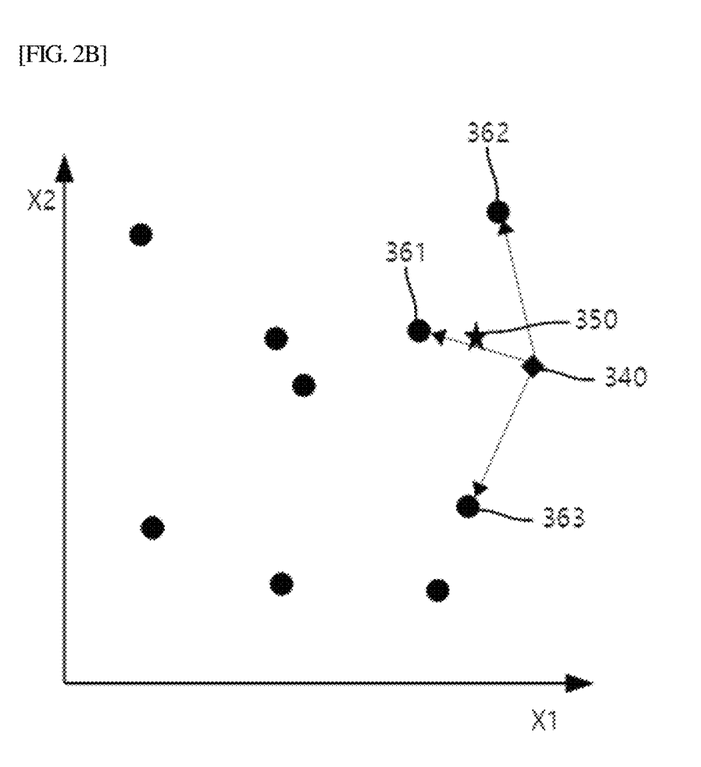

FIGS. 2A and 2B illustrating examples of a process of generating prediction data by the prediction unit 300 in the case of two tags.

In FIGS. 2A and 2B, the circle icons represent a prediction model as representing the values of tags X1 and X2 in each column of a matrix when the model is represented by a matrix. FIG. 2A shows a case where measurement data in a normal state is input, and FIG. 2B shows a case where measurement data in an anomalous state is input.

Referring to FIG. 2A, when the measurement data in a normal state 310 (square icon) is input, the prediction unit 300 compares the input with the prediction model and selects three data points 331, 332, and 333 with the highest similarity. Based on the three data points, prediction data 320 (star icon) is generated in a manner of a weighted average, a combination average, etc. In this case, the prediction data 320 and the measurement data 310 have almost the same value, and thus the anomaly detecting unit 400 may subsequently determine that the plant is in the normal state due to a small difference between the prediction data and the measurement data.

Referring to FIG. 2B, when measurement data 340 (square icon) in which the value of X1 is severely distorted due to faults is input, the prediction unit 300 compares the input with the prediction model and selects three data points 361, 362, and 363 with the highest similarity. Based on the data, prediction data 350 (star icon) 350 is generated in a manner of a weighted average, a combination average, etc. In this case, the prediction data 350 is considerably different from the measurement data 340, and thus the anomaly detecting unit 400 may subsequently determine that the plant is in an anomalous state.

Alternatively, if an operator has preset the acceptable residual size to a fairly large value, the plant may be determined as being in the normal state. In this case, errors may occur whereby faults cannot be detected or predicted.

In any case, in FIGS. 2A and 2B, with respect to X2, the value similar to data in the normal state is surmised as the prediction data, but with respect to X1, the value far different from data in the normal state is surmised as the prediction data. Thus, it is impossible to notify an operator as to what plant data in the normal state really is, which may result in a decrease in reliability of the prediction data.

The present invention is intended to propose an apparatus and method of predicting data, the apparatus and method being capable of enhancing prediction performance by enabling the prediction unit 300 to surmise accurate prediction data even though measurement data in the anomalous state is input. In order to achieve the above object, in the present invention, a method of determining similarity by using only measurement data of tags other than measurement data of tags determined to be anomalous is employed. The method may be realized by the apparatus for predicting data to be described later, and the apparatus for predicting data may replace the prediction unit 300 in FIG. 1.

Figure 3:
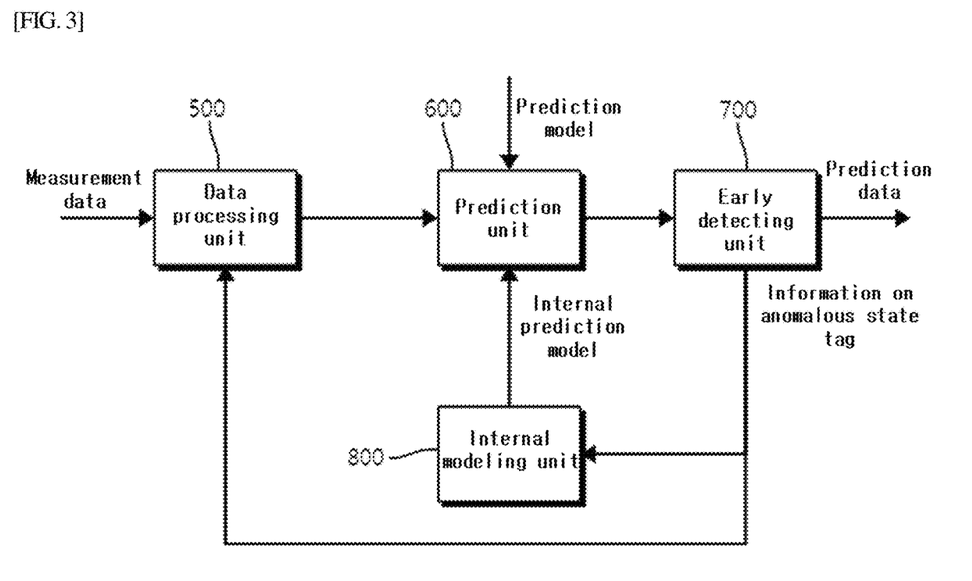
FIG. 3 is a block diagram of an apparatus for predicting data according to an embodiment of the present invention.

FIG. 3 illustrates a configuration of an apparatus for predicting data according to an embodiment of the present invention.

Referring to FIG. 3, the apparatus for predicting data according to the embodiment of the present invention may include a data processing unit 500, a prediction unit 600, an early detecting unit 700, and an internal modeling unit 800.

According to the embodiment of the present invention, the apparatus for predicting data may obtain prediction data in two stages, i.e., primary prediction and secondary prediction. The primary prediction may be performed in the same manner as the above-described prediction performed by the prediction unit 300 in FIG. 1. The secondary prediction is performed when the early detecting unit 700 determines that the result of primary prediction is anomalous.

Accordingly, the data processing unit 500 directly transmits (intact) the measurement data it receives to the prediction unit 600 for primary prediction. For secondary prediction, the data processing unit 500 removes, from the measurement data, measurement data of tags determined to be anomalous (hereinafter referred to as anomalous state tags) by the early detecting unit 700 and transmits the resulting measurement data to the prediction unit 600.

In the primary prediction, the prediction unit 600 performs prediction based on the prediction model of the normal state, which is generated by the plant modeling unit 200 in FIG. 1 and on the measurement data of all tags, thereby generating the result of the primary prediction. In the secondary prediction, prediction is performed based on an internal prediction model generated by the internal modeling unit 800 to be described later and on measurement data of tags other than tags determined to be anomalous, thereby generating secondary prediction data.

The early detecting unit 700 detects an anomalous state tag based on the result of primary prediction from the prediction unit 600. When there is no anomalous state tag, the result of primary prediction is directly output as prediction data. When an anomalous state tag is present, information on the anomalous state tag is generated and is transmitted to the internal modeling unit 800 and the data processing unit 500 for secondary prediction. Here, a method of detecting an anomalous state tag may be similar to the above-described method performed by the anomaly detecting unit 400 in FIG. 1, or it may be a completely different method. As an embodiment, the early detecting unit 700 compares the prediction data for each tag with the measurement data. When the difference is greater than or equal to a preset value or a preset ratio, or is n or more times greater than the average of differences, the tag is determined as being anomalous. The result from the early detecting unit 700 may be used only internally by the apparatus proposed in the present invention, and may not be displayed to the operator. The operator may only view the determination result from the anomaly detecting unit 400 in FIG. 1, which is based on the prediction data output from the apparatus proposed in the present invention and on the measurement data.

The internal modeling unit 800 is operated when the early detecting unit 700 detects the anomalous state tag. The prediction model in the normal state, which is used in primary prediction, may be newly updated and provided to the prediction unit 600. That is, in secondary prediction, by using only measurement data of tags in the normal state other than measurement data of the anomalous state tags determined to be anomalous, the prediction model in the normal state used in primary prediction is updated through optimization, whereby inputting of errors into the prediction model due to measurement data of the anomalous state tags may be prevented.

Figure 4:
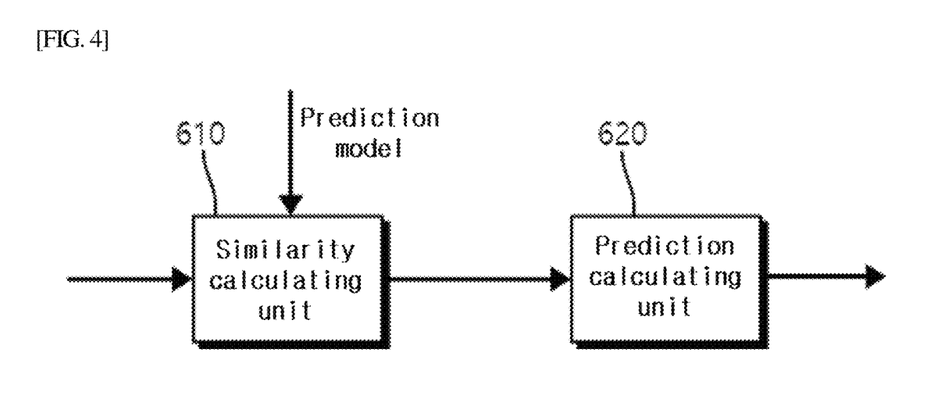
FIG. 4 is a block diagram of the prediction unit (600) of FIG. 3 employing the k-NN algorithm according to an embodiment of the present invention.

FIG. 4 illustrates a prediction unit 600 employing the k-NN algorithm according to an embodiment of the present invention.

In the k-NN algorithm, similarities between respective data sets of the prediction model and the input measurement data are compared, and k data sets with high similarity are used to calculate the prediction data. That is, a similarity calculating unit 610 may calculate similarity between each data of the prediction model and the input measurement data.

For example, the prediction model may be designated by Z, and Z may be composed of n rows indicating the number of tags and m columns indicating data sets, being expressed as follows.

$$Z = [Z_1 \ldots Z_m] = \begin{bmatrix} z_{1,1} & \cdots & z_{1,m} \\ \vdots & \ddots & \vdots \\ z_{n,1} & \cdots & z_{n,m} \end{bmatrix}$$

The input measurement data may be represented by $X=[x_1 \ldots x_n]^T$, and the result of similarity calculation by the similarity calculating unit 610 for each data set may be represented by $S=[s_1 \ldots s_m]^T$. Similarity $s_j$ for each data set may be obtained by following equation.

$$s_j(Z_j, X) = \exp\left(-\frac{\|Z_j - X\|^2}{2\sigma^2}\right)$$

Based on the similarity calculated by the similarity calculating unit 610 with the above-described method, a prediction calculating unit 620 may select k data sets having the highest similarity (when the value of $s_j$ is close to one, the similarity is high), and may obtain a combination average or a weighted average so as to obtain final prediction data. Here, k is a value that may be preset by the operator.

In the case of the k-NN algorithm, the internal modeling unit 800 may newly update the prediction model by removing the row of the tag determined as being in the anomalous state from the prediction model in the normal state. For example, when it is determined that measurement data of the tag corresponding to the second row is anomalous, the internal modeling unit 800 generates an updated prediction model of a (n−1)×m matrix in which the second row is removed and transmits the updated prediction model to the prediction unit 600, and the prediction unit 600 performs prediction again by using the prediction model of the (n−1)×m matrix and the input of a (n−1)×1 matrix in which measurement data of the tag determined by the data processing unit 500 to be anomalous is removed. Accordingly, influence of the measurement data of the anomalous state tag may be completely excluded.

Referring back to FIG. 2B, when the measurement data (the dark rhombus) 340 in which the value of X1 is severely distorted due to faults is input, the value of the prediction data 350 is significantly different from that of the prediction data 320 in the normal state shown in FIG. 2A, and thus it is impossible to provide accurate prediction data to the operator. However, the apparatus or method proposed in the present invention may provide accurate prediction data to the operator.

Figure 5:
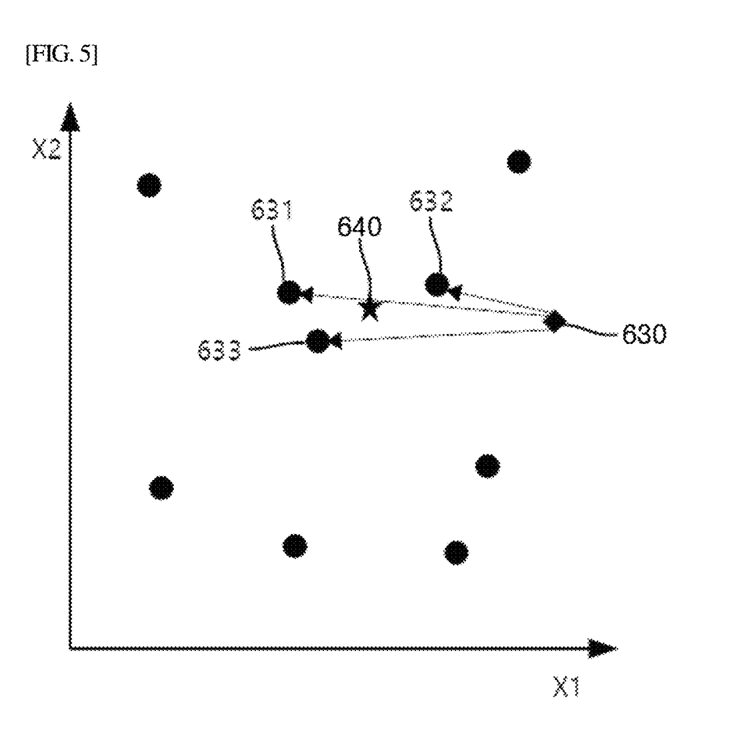
FIG. 5 is a graphical diagram for illustrating an example of a method of predicting data and the result when measurement data in which one of two tags is severely distorted due to faults is provided in an apparatus for predicting data according to an embodiment of the present invention.

FIG. 5 illustrates an example of a method of predicting data and the result when measurement data in which one of two tags is severely distorted due to faults is provided in an apparatus for predicting data according to an embodiment of the present invention.

Referring to FIG. 5, it is determined that measurement data of X1 tag is anomalous by primary prediction, and similarity is calculated by using measurement data of X2 tag and not the measurement data of X1 tag. As the result of calculating the similarity by using only the measurement data of X2 tag, three data sets 631, 632, and 633 of the prediction model having the highest similarity and values are averaged to determine final prediction data 640. The final prediction data 640 is far different from measurement data 630, and thus the final prediction data may be determined to be anomalous by the anomaly detecting unit 400. In contrast, the final prediction data 640 is similar to the prediction data 320 in the normal state. That is, even though measurement data contains severely distorted values due to faults or anomalies, precise prediction data in the normal state may be provided.

As another embodiment which may show the effect of the present invention, the following case is assumed. That is, it is assumed that the prediction model Z has the following matrix values and k is one.

$$Z = \begin{bmatrix} 1 & 1.2 & 1.3 & 1.4 & 1.5 \\ 2 & 1.9 & 2.1 & 1.8 & 2.2 \\ 3 & 2.9 & 2.8 & 3.1 & 3.2 \\ 4 & 3.5 & 4.2 & 3.8 & 3.9 \\ 5 & 4.8 & 5.1 & 5.2 & 4.7 \end{bmatrix}$$

It is assumed that the input measurement data is $X=[10\ 2.1\ 2.8\ 4.2\ 5.1]^T$. That is, the value of only the first tag in a data set of the third column, which is changed from 1.3 to 10 due to faults, is assumed as input of measurement data. The calculated similarity for each data set is $S=[1.8373\ 1.5471\ 1.3385\ 1.3062\ 1.1998]^T$, and therefrom, the data set of the fifth column is set as prediction data. Anomalies and faults occurring in one tag may influence prediction data of another tag, and a significant difference between the measurement data and the prediction data may occur overall, thereby indicating presence of errors. However, in this case, it is impossible to generate accurate prediction data for each tag.

In contrast, the similarity S=[0.0373 0.0804 0.0000 0.0776 0.0665]$^T$ excluding the value of the first tag determined to have faults is calculated, and thus the data set of the third column is set as the prediction data. The prediction data of the first tag is 1.3, and prediction data of other tags have accurate values. That is, in the case of using the apparatus proposed in the present invention, even though measurement data of a tag with faults is present, prediction data to be output may be prediction data in the normal state, which may show the current plant condition. Particularly, even for the tag with faults, prediction data in the normal state may be provided.

Figure 6:
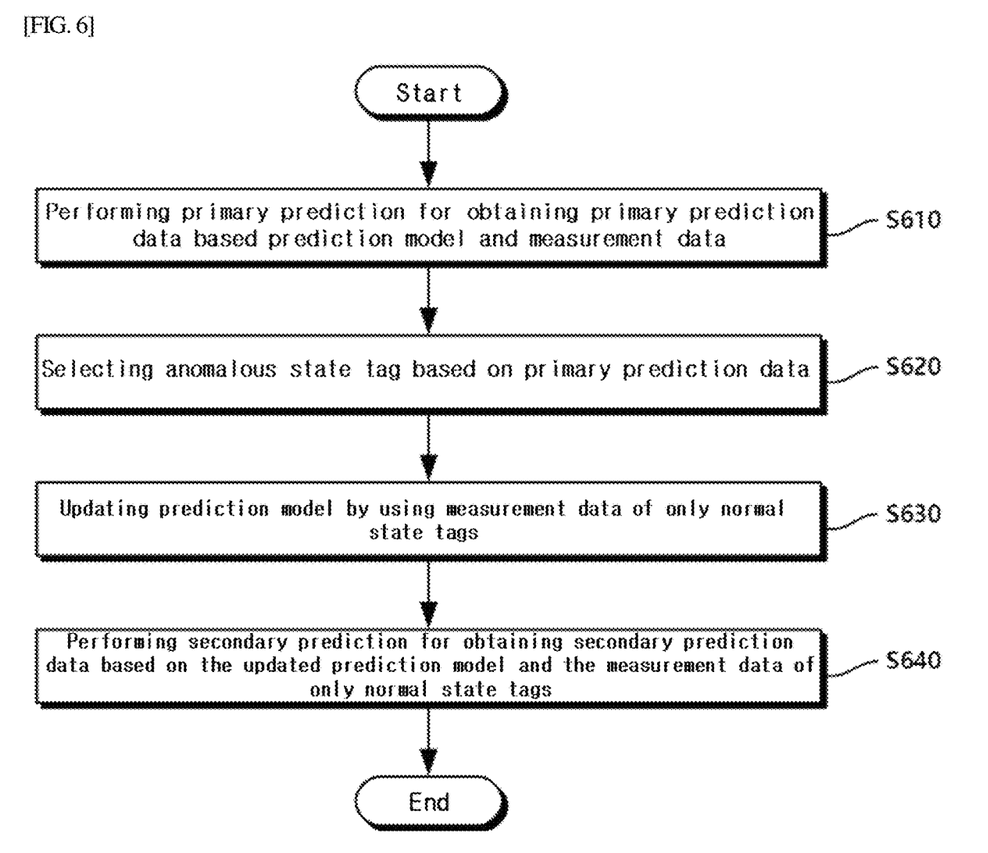
FIG. 6 is a flow diagram of a method of predicting data according to an embodiment of the present invention.

FIG. 6 illustrates a method of predicting data performed by an apparatus for predicting data according to an embodiment of the present invention.

Referring to FIG. 6, the apparatus for predicting data performs primary prediction at step S610 in which primary prediction data is generated based on a preset plant prediction model and measurement data of all tags. Here, as the plant prediction model, either an existing parametric model or an existing non-parametric model may be used, and primary prediction is performed according to the plant prediction model. As an example, when using the plant prediction model based on the k-NN algorithm, the similarities between respective data sets of the prediction model and the measurement data are compared, k data sets are selected in order of decreasing similarity, and a combination average or a weighted average of the selected data sets is used to generate primary prediction data, whereby primary prediction is performed.

At step S620, an anomalous state tag may be selected based on the primary prediction data obtained from primary prediction. Various methods of selecting the anomalous state tag may be applied. As an embodiment, the primary prediction data and the measurement data may be compared for each tag, and the selected tag may be a tag showing a difference that is greater than or equal to a preset value or a preset ratio. As another embodiment, the selected tag may be a tag showing a difference that is n or more times greater than the average of differences between the primary prediction data and the measurement data of all tags.

When the anomalous state tag is not selected, the measurement data for all tags is determined as the measurement data in the normal state and the primary prediction data is determined as the prediction data in the normal state, and thus the prediction data is directly output without performing secondary prediction.

However, when the anomalous state tag is selected, the result of primary prediction contains errors due to the measurement data of the anomalous state tag, and is not accurate prediction data in the normal state. In order to generate the accurate prediction data in the normal state, secondary prediction is performed. To this end, first, the prediction model used in primary prediction may be updated at step S630 by using the measurement data of tags exclusive of the tag selected as the anomalous state tag. That is, parameters of the prediction model are updated by using the measurement data of only normal state tags and by excluding the measurement data of the anomalous state tag. When the plant prediction model is based on the k-NN algorithm, the update to an n*×m prediction model in which the row corresponding to the anomalous state tag is excluded from the n×m prediction model used in primary prediction is performed.

At step S640, secondary prediction may be performed based on the updated prediction model and the measurement data of only normal state tags, which is, excluding the selected anomalous state tag. The secondary prediction may be performed in the same manner as the primary prediction, but the prediction model and the input measurement data are different from those in the primary prediction. In the case of the k-NN manner, the similarities between respective data sets of the n*×m prediction model and the n*×1 measurement data in which the measurement data of the anomalous state tag is excluded are compared, k data sets are selected in order of decreasing similarity, and a combination average or a weighted average of the values of each tag in the selected data sets is calculated so as to determine prediction data for each tag. The prediction data by the secondary prediction is directly output as the final prediction data FIG. 7 compares prediction results achieved by the method of the present invention with prediction results achieved through conventional primary prediction alone.

Figure 7:
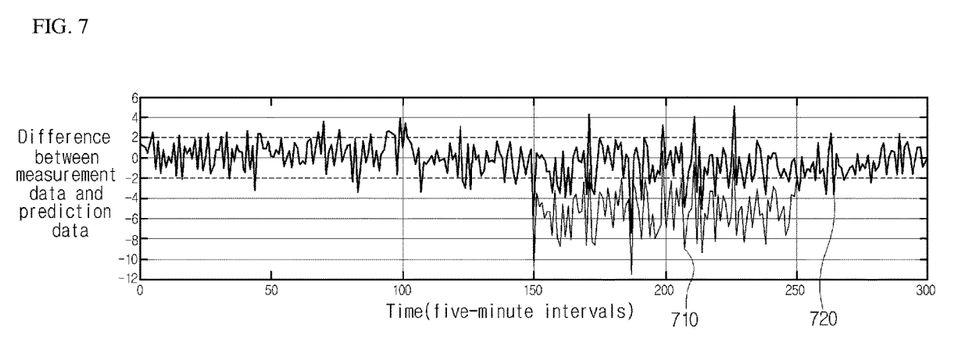
FIG. 7 is a graph illustrating a comparison of prediction results when the method provided in the present invention and only conventional primary prediction are performed.

In the graph of FIG. 7, the x-axis represents the measurement time of a particular tag that is measured at five-minute intervals, and the y-axis represents the difference between the measurement data measured at the measurement time and the prediction data generated by the apparatus for predicting data. In the time period from 150 to 250, in order to verify the performance of the apparatus for predicting data proposed in the present invention, a virtual anomalous signal corresponding to 1.2 times of the existing measurement data was generated and applied, and the results were compared. The plot 710 is the difference between the measurement data (actual data) in the normal state and the prediction data when only primary prediction is performed, and the plot 720 is the difference between the measurement data (actual data) in the normal state and the prediction data when both primary and secondary prediction as proposed in the present invention are performed.

Referring to FIG. 7, in the time period from 150 to 250 containing the anomalous signal, the difference of the plot 710 was much larger than the difference of the plot 720. Comparing the root-mean-square-error (RMSE) between the two methods, it was verified through experimentation that there was a performance improvement of 62.2%, from 5.7911 for the conventional method to 2.1873 for the method provided in the present invention.

As described above, compared to the conventional prediction apparatus and method, the apparatus and method of predicting data proposed in the present invention may enhance reliability of the system by providing prediction data in the normal state to the operator with much higher performance.

Furthermore, the apparatus and method proposed in the present invention may minimize errors that may occur in selection of the anomalous state tag by preventing measurement data of the anomalous state tag from affecting the prediction data of the normal state tag.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of generating plant normal state prediction data based on measurement data of multiple tags and a preset plant prediction model that contains multiple data sets each having a single value for each of the multiple tags, the method comprising:

generating final prediction data by generating primary prediction data and secondary prediction data in real time;

generating the primary prediction data by performing primary prediction based on the measurement data and the preset plant prediction model, the primary prediction generating the primary prediction data by
  determining similarity between each of the multiple data sets and the measurement data of the multiple tags,
  selecting k data sets in order of decreasing similarity among the multiple data sets, and
  determining the primary prediction data for each tag by obtaining an average for each tag by multiplying each of the k data sets by a weight that is multiplied by each of the k data sets and is a higher weight for determinations of a higher similarity in each data set;
selecting an anomalous state tag among the multiple tags based on a predetermined value, the selected anomalous state tag determined as data of an anomalous state based on measurement data corresponding to the primary prediction data;
generating an internal plant prediction model by updating the preset plant prediction model by using the measurement data of only normal state tags, the normal state tags being remaining tags except the selected anomalous state tags among the multiple tags;
generating the secondary prediction data by performing secondary prediction based on the measurement data of the normal state tags and the internal plant prediction model; and
directly outputting the primary prediction data as the final prediction data when there is no anomalous state tag and otherwise outputting the secondary prediction data as the final prediction data.

2. The method of claim 1, wherein the anomalous state tag is selected by
  calculating a difference between the measurement data and the primary prediction data obtained as a result of the primary prediction for each of the multiple tags, and
  identifying a tag showing the difference to be greater than or equal to the predetermined value or a predetermined ratio.

3. The method of claim 1, wherein the anomalous state tag is selected by
  calculating a difference between the measurement data and the primary prediction data obtained as a result of the primary prediction for each of the multiple tags, and
  identifying a tag showing the difference to be at least n times greater than an average of differences between the primary prediction data and the measurement data of all tags.

4. The method of claim 1, wherein the internal plant prediction model is represented by an n×m matrix to an n*×m matrix in which a row corresponding to the selected anomalous state tag is removed, where n is a number of the tags, m is a number of the data sets, and n* is obtained by subtracting a number of anomalous state tags from n.

5. The method of claim 1,
  wherein the secondary prediction data is generated by
    determining similarity between each of multiple data sets contained in the internal plant prediction model and the measurement data of the normal state tags;
    selecting k data sets in order of decreasing similarity among the multiple data sets; and
    determining the secondary prediction data for each tag by obtaining an average for each tag by multiplying each of the k data sets by a weight that is multiplied by each of the k data sets and is a higher weight for determinations of a higher similarity in each data set.

6. The method of claim 1, further comprising:
  determining the anomalous state based on the final prediction data and the measurement data of the multiple tags.

7. An apparatus for generating plant normal state prediction data based on measurement data of multiple tags and a preset plant prediction model that contains multiple data sets each having a single value for each of the multiple tags, through primary prediction and secondary prediction, the apparatus comprising:
  an internal modeling unit configured to generate an internal plant prediction model;
  a data processing unit configured to output the measurement data of the multiple tags in the primary prediction and to output the measurement data of normal state tags, from which the measurement data of an anomalous state tag has been removed, in the secondary prediction, the normal state tags being remaining tags except the anomalous state tag among the multiple tags;
  a prediction unit configured to receive the outputs from the data processing unit and to generate primary prediction data and secondary prediction data in real time, the primary prediction data generated based on the preset plant prediction model and the measurement data of the multiple tags in the primary prediction, the secondary prediction data generated based on the internal plant prediction model and the measurement data of the normal state tags in the secondary prediction, the prediction unit further configured to
    determine similarity between each of the multiple data sets and the measurement data of the multiple tags,
    select k data sets in order of decreasing similarity among the multiple data sets, and
    determine the primary prediction data for each tag by obtaining an average for each tag by multiplying each of the k data sets by a weight that is multiplied by each of the k data sets and is a higher weight for determinations of a higher similarity in each data set; and
  an early detecting unit configured to select the anomalous state tag based on the primary prediction data and the measurement data of multiple tags based on a predetermined value and to generate final prediction data based on the selection, the early detecting unit outputting the primary prediction data as the final prediction data when the anomalous state tag is not and outputting the secondary prediction data as the final prediction data when the anomalous state tag is selected,
  wherein the internal modeling unit is further configured to generate the internal plant prediction model by updating the preset plant prediction model based on information on the anomalous state tag received from the early detecting unit in the secondary prediction, and to transmit the internal plant prediction model to the prediction unit.

8. The apparatus of claim 7, wherein the secondary prediction is performed only when the early detecting unit has selected the anomalous state tag.

9. The apparatus of claim 7, wherein the early detecting unit calculates a difference between the primary prediction data and the measurement data for each of the multiple tags, and selects a tag showing the difference to be greater than or equal to the predetermined value or a predetermined ratio as the anomalous state tag.

10. The apparatus of claim 7, wherein the early detecting unit calculates a difference between the measurement data and the primary prediction data obtained as a result of the primary prediction for each of the multiple tags, and selects a tag showing the difference to be at least n times greater than an average of differences between the primary prediction data and the measurement data of all tags.

11. The apparatus of claim 7, wherein the prediction unit is further configured to:
- determine similarity between each of multiple data sets contained in the internal plant prediction model and the measurement data of the normal state tags;
- select k data sets in order of decreasing similarity among the multiple data sets of the internal plant prediction model; and
- determine the secondary prediction data for each tag by obtaining an average for each tag by multiplying each of the k data sets by a weight that is multiplied by each of the k data sets and is a higher weight for determinations of a higher similarity in each data set.

12. The apparatus of claim 7, wherein the internal modeling unit is further configured to update the preset plant prediction model using an n×m matrix to an n*×m matrix in which a row corresponding to the selected anomalous state tag is removed, where n is a number of the tags, m is a number of the data sets, and n* is obtained by subtracting a number of anomalous state tags from n.

* * * * *